United States Patent

Sasaki et al.

Patent Number: 5,073,606
Date of Patent: Dec. 17, 1991

[54] METHACRYLIMIDE CONTAINING POLYMER

[75] Inventors: Isao Sasaki, Otake; Kozi Nishida, Toyama; Hisao Anzai, Otake, all of Japan

[73] Assignee: Mitsubishi Rayon Company, Limited, Tokyo, Japan

[21] Appl. No.: 684,504

[22] Filed: Apr. 15, 1991

Related U.S. Application Data

[63] Continuation of Ser. No. 461,337, Dec. 28, 1989, abandoned.

[30] Foreign Application Priority Data

Dec. 29, 1988 [JP] Japan .............................. 63-334725

[51] Int. Cl.⁵ .............................................. C08F 8/32
[52] U.S. Cl. .................................. 525/330.5; 525/378; 525/379
[58] Field of Search ...................... 525/330.5, 378, 379

[56] References Cited

U.S. PATENT DOCUMENTS

| | | |
|---|---|---|
| 2,146,209 | 2/1939 | Graves . |
| 3,284,425 | 11/1966 | Schroder et al. . |
| 4,246,374 | 1/1981 | Kopchik . |
| 4,727,117 | 2/1988 | Hallden-Abberton et al. . |
| 4,745,159 | 5/1988 | Anzai et al. . |
| 4,816,524 | 3/1989 | Anzai et al. . |

*Primary Examiner*—Bernard Lipman

*Attorney, Agent, or Firm*—Oblon, Spivak, McClelland, Maier & Neustadt

[57] ABSTRACT

A methacrylimide containing polymer which is a thermoplastic polymer comprising from 2% to 100% by weight of a structural unit represented by the general formula:

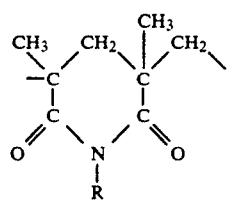

where R represents a hydrogen atom or an aliphatic group, aromatic group or cycloaliphatic hydrocarbon group with 1 to 20 carbon atoms and from 0 to 98% by weight of a structural unit derived from as ethylenic monomer, the polymer having (a) a molecular weight (Mw) of greater than 50,000 and less than 200,000 as measured by GPC, and
(b) an amount of amide segments in the polymer of less than 5% by weight. The methacrylimide containing polymer has excellent transparency and heat resistance, as well as a low yellowness and aging coloration under heating.

4 Claims, No Drawings

METHACRYLIMIDE CONTAINING POLYMER

This application is a continuation-in-part continuation division of application Ser. No. 07/461,337, filed on Dec. 28, 1989, now abandoned.

BACKGROUND OF THE INVENTION

1. Field of the Invention

The present invention concerns a methacrylimide containing polymer of excellent transparency and heat resistance.

2. Description of the Prior Art

Methyl methacrylate polymers are excellent not only in transparency but also in weather proofness and mechanical property and, accordingly, they have been used as high performance optical plastic material and decorative materials. In recent years, their uses have been developed in the field of short distance light communication or optical sensors. However, since the heat-distortion temperature of methyl methacrylate polymers is as low as about 100° C., they are not satisfactory for the use to applications requiring heat resistance and thus, there is a strong demand in the market for improving the heat resistance of methyl methacrylate polymers.

As a method of improving the heat resistance of a methyl methacrylate polymer, there has been proposed, for example, (1) a method of reacting a polymer of acrylic acid, methacrylic acid or an ester thereof with a primary amine, ammonia or a compound of forming a primary amine or ammonia in the presence of a solvent (refer to U.S. Pat. No. 2,146,209, German Patent Nos. 1077872 and 1242369), (2) a method of reacting a methyl methacrylate polymer with a primary amine in the presence of water (refer to U.S. Pat. No. 3,284,425) or (3) a method of reacting an acrylic polymer and ammonia or primary amine in an extruder (refer to U.S. Pat. No. 4,246,374).

However, in the method (1) described above, since the boiling point of the solvent used is high, it is difficult to completely separate the solvent from a resultant imidized polymer in a commercial scale and, as a result, the imidized polymer obtained is colored to reduce its transparency. In the method (2) described above, since reaction is conducted in the presence of water, methyl methacrylate segments suffer from hydrolysis in the case of intending to obtain a partially imidized polymer, making it difficult to obtain an imidized polymer having a desired heat resistance, as well as it is also difficult to perform uniform imidizing reaction. Further, in the method (3) described above, since the imidizing reaction is conducted between a polymer of high viscosity and a gaseous imidizing material, it is difficult to conduct a homogenous imidizing reaction, making it difficult to obtain a homogenously and partially imidized polymer.

Accordingly, although the heat resistance of the imidized polymers obtained by the methods described above is somewhat improved, since the transparency is poor, the molecular weight is substantially reduced, or imidization of the polymer is conducted only not-homogenously upon commercial production, these methods have not yet been put to practical use at present.

An object of the present invention is to improve the foregoing drawbacks in the prior art and provide a methacrylimide containing polymer possessing properties such as excellent optical property, mechanical property, weather proofness and fabricability inherent in methacrylic acid ester polymers, and excellent in transparency and heat resistance.

SUMMARY OF THE INVENTION

The foregoing object of the present invention is achieved by a methacrylimide containing polymer comprising from 2 to 100 % by weight of a structural unit represented by the general formula (I):

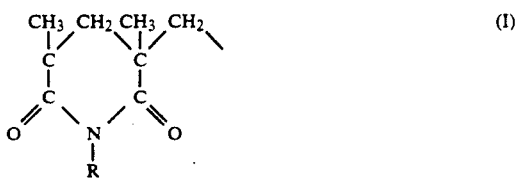

where R represents a hydrogen atom or an aliphatic group, aromatic group or cycloaliphatic hydrocarbon group with 1 to 20 carbon atoms, and from 0 to 98 % by weight of a structural unit derived from ethylenic monomer, wherein (a) a molecular weight (Mw) of the polymer as measured by GPC is from 50,000 to 200,000,
(b) an amount of amide segments in the polymer is less than 5% by weight and, preferably,
(c) an iron content in the polymer is less than 20 ppm,
(d) an amount of low molecular weight amide derivatives as volatile ingredient in the polymer is less than 1000 ppm,
(e) an amount of residual monomers as the volatile ingredient in the polymer is less the 500 ppm,
(f) a distribution range of an imidization ratio in the polymer is less than 5 %,
(g) an amount of fine particles sized from 0.5 μm to 25 μm in the polymer as measured by a fine particle counter is less than 50,000/g, and
(h) a $YI_0$ as measured by a color difference meter is less than 3.

DETAILED DESCRIPTION OF THE PREFERRED EMBODIMENTS

The methacrylimide containing polymer according to the present invention can be prepared by continuously supplying a monomer solution to a specific reaction area, carrying out polymerization such that the conversion of the monomer into a polymer in the reaction area reaches a predetermined value, thereafter, conducting imidization reaction in a specific reaction area and then separating volatile ingredients from the resultant imidized polymer.

The methacrylimide containing polymer according to the present invention can, preferably, be produced continuously by the following method with a commercial advantage:

An inert gas is introduced into a solution comprising from 10 to 60 % by weight of an inert solvent, from 90 to 40 % by weight of a methacrylic acid ester or a mixture of a methacrylic acid ester and an ethylenic monomer copolymerizable with the methacrylic acid ester, from 0.0001 to 0.5 % by weight of a radical polymerization initiator and from 0 to 5 % by weight of a polymer molecular weight regulator, to reduce an amount of dissolved oxygen to less than 1 ppm. Then, after filtering the solution, as required, through a filter of less than 1 μm pore size, the filtrate is continuously introduced into a first reaction area in which reactants are mixed substantially uniformly and at least 40 % by weight of the monomer is converted into a polymer at a temperature from 60° to 190° C. Subsequently, after converting at least 80 % by weight of the initial monomer into a polymer at a temperature from 80° to 170° C. in a second reaction area having a plug flow stream, resultant polymer solution and an imidizing material which is filtered in advance, as required, through a filter of less than 1 μm pore size and represented by the following general formula (II):

$$R-NH_2$$

where R represents a hydrogen atom or an aliphatic group, aromatic group or cycloaliphatic hydrocarbon group with 1 to 20 carbon atoms are mixed substantially uniformly for at least for one minute, if required, at a temperature from 50° to 190° C. Then, in a third multi-stage reaction area having at least one upper region (b) and at least one lower region (a), imidization reaction is carried out in such a way that in the first lower region (a) the reaction is conducted at a temperature from 150° to 350° C. and then the reaction product is aged at a temperature from 150° to 350° C. in the upper region (b). The reaction solution in the upper region (b) heated to a temperature from 150° to 350° C. is introduced into an area at an atmospheric pressure or a reduced pressure in which volatile ingredients are continuously separated from the polymer until an amount of low molecular weight volatile amide derivatives is reduced, preferably, to less than 1,000 ppm and residual monomers is reduced, preferably, to less than 500 ppm. Then, the polymer is molded, preferably, by using a single screw or twine screw bent extruder comprising a corrosion resistant screw portion and a barrel portion.

The polymer according to the present invention and the production process therefor will be described below in more detail.

The methacrylimide containing polymer in the present invention is an imidization product of a methacrylic acid ester polymer. The methacrylic acid ester polymer to be imidized is a homopolymer of methacrylic acid ester or a copolymer of a methacrylic acid ester and an ethylenic monomer copolymerizable with methacrylic acid ester and has, preferably, from 0.01 to 3.0 of an intrinsic viscosity.

The methacrylic acid ester includes methyl methacrylate, ethyl methacrylate, propyl methacrylate, n-butyl methacrylate, isobutyl methacrylate, tert-butyl methacrylate, cyclohexyl methacrylate, norbonyl methacrylate, 2-ethylcyclohexyl methacrylate or benzyl methacrylate. As the copolymerizable ethylenic monomer, there can be mentioned methacrylic ester other than methyl methacrylate, acrylic acid ester such as methyl acrylate, ethyl acrylate, propyl acrylate, n-butyl acrylate, isobutyl acrylate, tert-butyl acrylate, cyclohexyl acrylate, norbonyl acrylate, 2-ethylhexyl acrylate and benzyl acrylate, acrylic acid, methacrylic acid, styrene and substituted styrene such as 2-methyl styrene. The above-mentioned monomer may be used alone or two or more of them may be used in combination.

Among the methacrylic acid ester polymers described above, a homopolymer of methyl methacrylate or copolymer comprising more than 25 % by weight of methyl methacrylate and less than 75 % by weight of a copolymerizable ethylenic monomer is preferred.

Among all, a homopolymer of methyl methacrylate is most preferred in view of its high transparency.

The polymerization reaction and the imidization reaction are carried out in the presence of a solvent. It is necessary that the inert solvent used herein does not hinder the progress of the polymerization reaction and the imidization reaction, and does not substantially react with the reaction mixture. Further, in the case of partially imidizing methyl methacrylate polymer, it is necessary that the solvent does not have any effect on methyl methacrylate or other methacrylic acid ester segment. Further, the solvent should be easily separated from the resultant imidized polymer.

As a preferred example of the solvent, a solvent mixture comprising a poor solvent capable of hardly dissolving a methacrylic resin at an ambient temperature and having a boiling point under a normal pressure of 50° to 150° C. and a good solvent capable of easily dissolving the methyl methacrylate polymer is used. Preferably, a poor solvent having solubility parameter δ within a range from 14.0 to 19.5 $(cal/cm^3)^{\frac{1}{2}}$. and a good solvent having solubility parameter δ within a range from 8.0 to 13.9 $(cal/cm^3)^{\frac{1}{2}}$ are used in combination. An example of the poor solvent is methanol. Examples of the good solvent can include alcohols such as pentanol, hexanol, 2-methylpentanol, 4-methyl-2-pentanol, 2-ethyl-1-butanol, 1-pentanol and octanol; aromatic hydrocarbon compounds such as benzene, toluene, xylene, ethylbenzene, cumene, mesitylene, naphthalene, tetralin, butyl benzene, diethyl benzene, pentyl benzene and biphenyl; ketones or ether compounds such as phorone, isophorone, cyclohexanone, acetophenone, dibutyl ether, dihexyl ether, anisole, phenetole, butyl phenyl ether, diphenyl ether, diglyme and diethylene glycol diethyl ether. Among the good solvents, toluene, benzene, xylene and ethyl benzene are preferred.

The solubility parameter δ of the solvent used in the present invention means those values according to the standards as described in Polymer Handbook, Second Edition, J. Brandrup, E. H. Immergut, John. Wiley & Sons, New York (1975).

If the boiling point of the poor solvent and the good solvent exceeds 150° C. under a normal pressure, it is difficult to sufficiently remove volatile materials comprising the solvents as the main ingredient from the reaction products obtained by the imidization reaction. If it is lower than 50° C., since the temperature for the imidization reaction can not be increased due to the increase in the internal pressure of the reaction system, no sufficient imidization reaction can be conducted. In addition, since the volatile materials are evaporated suddenly upon separating them from the reaction products in the latter case, control in the devolatilizing operation becomes difficult. Further, if the solubility parameters of the poor solvent and the good solvent is out of the above-mentioned range, it is difficult to conduct uniform polymerization reaction and uniform imidization reaction, making it difficult to obtain a methacylimide containing polymer of excellent quality.

The amount of the solvent used is from 10 to 60 by weight based on the total weight of the solvent and the monomer. If the amount of the solvent used is less than 10 % by weight, the viscosity of the reaction system becomes too high, making it difficult to handle the reaction product. In addition, since the polymerization or imidization reaction proceeds not homogenously, the quality of the resultant polymer is deteriorated. If the amount of the solvent used exceeds 60 % by weight, not only the separation of the solvent from the polymer becomes difficult but also productivity of the polymer is reduced. The amount of the solvent used is preferably from 20 to 50 % by weight.

In the case of using the mixed solvent, the ratio of the poor solvent to the good solvent is from 99/1 to 1/99, preferably, from 90/10 to 10/90 (by weight ratio).

Since the inert solvent used easily diffuses the imidizing material between the methacylic polymer molecules in the imidization reaction, thereby enabling to uniformly and rapidly conduct the imidization reaction and enabling to effectively control the heat generation and heat removal in the reaction, it is possible to obtain a methacrylimide containing polymer of excellent transparency and heat resistance as a desired optical material.

The radical polymerization initiator includes those which actively decompose to form radicals at the reaction temperature and there can be mentioned, for example, organic peroxides such as di-tert-butyl peroxide, dicumyl peroxide, methyl ethyl ketone peroxide, di-tert-butyl perphthalate, di-tert-butyl perbenzoate, tert-butyl peracetate, 2,5-dimethyl-2,5-di-(tert-butyl peroxy)hexane, di-tert-amyl peroxide, 2,5-dimethyl-2,5-di-(tert butylperoxy)hexane, benzoyl peroxide and lauryl peroxide, as well as azo compounds such as azobisisobutanol diacetate, 1,1-azobiscyclohexane carbonitrile, 2-phenylazo-2,4-dimethyl-4-methoxyvalero nitrile, 2-cyano-2-propylazo formamide and 2,2'-azobisisobutyronitrile. These radical polymerization initiators may be used alone or as a mixture of two or more of them. The amount of the radical polymerization initiator used is selected within a range from 0.0001 to 0.5 % by weight based on the solution containing the monomer.

As the polymer molecular weight regulator, conventional regulators such as mercaptans can be mentioned. As specific examples of mercaptans used, there can be mentioned, for example, primary, secondary and tertiary mercaptans having alkyl group or substituted alkyl group, for example, n-butyl, isobutyl, n-octyl, n-dodecyl, sec-butyl, sec-dodecyl, tert-butyl mercaptan; aromatic mercaptans for example, phenyl mercaptan, thiocresol, 4-tert-butyl-o-thiocresol; thioglycolic acid and ester thereof; and mercaptans such as ethylene thioglycol having 3 to 13 carbon atoms. The regulator is used in an amount of less than 5.0 % by weight and, preferably, less than 1.0 % by weight based on the monomer solution. Further, as the nonmercaptan type molecular weight regulator, there can be used at least one of $\beta$-terpinolene, terpinol and alkyl-substituted-1,4-cyclohexadiene. As alkyl-substituted 1,4-cyclohexadiene, there can be mentioned, for example, $\gamma$-terpinene, 2-methyl-1,4-cyclohexadiene, 2,6-dimethylcyclohexadiene, 2,5-dimethylcyclohexadiene, 2-isopropyl-1,4-cyclohexadiene and 2-ethyl-1,4-cyclohexadiene. The substantial amount of them to be used is less than 5 % by weight.

An inert gas is introduced into the monomer solution prepared as described above to reduce the amount of dissolved oxygen in the solution to less than 1 ppm. If the amount of dissolved oxygen exceeds 1 ppm, yellowness of the resultant methacrylimide containing polymer is increased. There is no particular restriction for the method of reducing the amount of dissolved oxygen in the monomer solution to less than 1 ppm, but it is desirable to continuously supply the solution, preferably, to a counter-current column (tower), in which inert gases such as nitrogen gas and the solution are brought into contact in a counter current manner, thereby driving out dissolved oxygen into the inert gas by utilizing the gas-liquid equilibrium to effectively remove them. With a usual inert gas bubbling method in a feed tank conventionally used, reduction limit is 10 to 20 ppm and it is difficult to reduce dissolved oxygen to less than 1 ppm.

After thus reducing the amount of dissolved oxygen in the monomer solution to less than 1 ppm, it is preferred to filter the solution through a filter of less than 1 $\mu$m pore size. FLUOROPORE manufactured by Sumitomo Denko Co. can be used prerefably as such a filter.

The content of fine particles sized from 0.5 to 25 $\mu$m in the polymer obtained through such filtration is less than 50,000/gr of polymer as measured by a fine particle counter.

Then, the monomer solution applied with the treatments for removing the dissolved oxygen and, if required, for removing fine particles is introduced into a first reaction area in which reactants are mixed substantially uniformly, and at least 40 % by weight of the monomer is converted into a polymer at a temperature from 60° to 190° C. If the polymerization temperature in the first reaction area is lower than 60° C., the viscosity of polymer solution becomes too high, making it difficult to mix the polymer solution uniformly. If the polymerization temperature exceeds 190° C., formation of the side-reaction products is increased. Accordingly, the polymerization temperature in the first reaction area is generally from 60° to 190° C., preferably, from 70° to 180° C.

If the conversion of the monomer into the polymer in the first reaction area is lower than 40 % by weight, it has been found that the heat decomposition resistance of the methacrylimide containing polymer finally obtained is deteriorated. Although the reason is not apparent, it is assumed to be attributable to the change of the terminal structure of polymer molecules relevant to the terminating reaction mechanism for the polymerization. If the heat decomposition resistance of the polymer is reduced, defects referred to as a silver streak are formed due to decomposed products during molding fabrication of the polymer to impair the appearance of the mold and the deteriorate the physical property of the molded product as well. Accordingly, the conversion of the monomer into polymer in the first reaction area is at least 40 % by weight and, preferably, at least 60 % by weight. If the inside of the first reaction area is not substantially uniformly mixed and thus polymers with the conversion of not greater than 40 % by weight remains in the reaction system as a part of the product, polymers of poor heat decomposition resistance are formed partially. Thus, it is necessary that the inside of the first reaction area be mixed sufficiently to maintain a substantially homogenous state. The reaction area mixed substantially uniformly can be attained usually by using a stirring-mixing vessel equipped with a stirrer of anchor, helical ribbon, screw or paddle type.

The polymer solution leaving the first reaction area is successively polymerized in a second reaction area having a plug flow stream at a temperature of 80° C. to 170° C. such that at leas 80 % by weight of the initial monomer is converted into a polymer.

The imidizing material represented by the foregoing formula (II) used in the third reaction area partially reacts with, if any, remaining monomer to form low molecular weight amide derivatives as a high boiling point by-product. If a large amount of unpolymerized monomer remains in the reactants at the second reaction area and enters as it is into the third reaction area, formation of the amide derivatives is increased, making it difficult to separate them from the polymer. If the amide derivative remains in the reaction product, it results in coloration of the polymer or deterioration of the quality of the polymer. Accordingly, in order to suppress the formation of the amide derivatives in the third reaction area, the conversion for the initial monomer to polymer in the second reaction area is at least 80 % by weight, preferably, at least 90 % by weight.

For attaining a high conversion in the second reaction area, it requires a reaction device having a plug flow stream, that is, a device designed to have a relatively long shape in which the material is supplied from one end and discharged from the other end and mixing of the material in the longitudinal direction of the reaction device is not substantially taken place. As the example, there can be mentioned a screw extruder type reaction device as described in U.S. Pat. No. 3,234,303, a column-like reaction device as described in U.S. Pat. No. 3,252,950, a tubular reaction device incorporated with buffle plates or a hollow tubular reaction device as described in British Patent No. 2101139 and the like.

The polymerization temperature in the second reaction area is lower than 170° C. The conversion in the second reaction area is set at least to 80 % with the reason as described above, but the highest polymerization ratio attainable is controlled by equilibrium between the growing reaction and reverse growing reaction of an active polymer at a specific temperature to be adopted for the polymerization. If the polymerization temperature exceeds 170° C., it becomes difficult to attain the conversion of 80 %. On the other hand, if the polymerization temperature is lower than 80° C., the polymerization speed is reduced to bring about an economical disadvantage and the transportation of the reaction solution becomes difficult due to increased viscosity. Accordingly, the reaction temperature in the second reaction area is from 80° to 170° C. and, preferably, from 90° to 160° C. The imidizing material represented by the foregoing general formula (II) is added to a polymer solution leaving the second reaction area which is then introduced to the third reaction area. It is preferred that also the imidizing material is previously filtered through a filter of less than 1 μm pore size. The imidizing material may be used alone or being dissolved and diluted in the inert solvent as described above. In the case of diluting the imidizing material with an inert solvent, it is naturally desirable that the amount of the dissolved oxygen is reduced to 1 ppm and the solution is filtered through a filter of less than 1 μm pore size like that the monomer solution is.

It is preferred that the polymer solution leaving the second reaction area and the imidizing material represented by the foregoing general formula (II) are mixed substantially uniformly. It is preferred that they are uniformly mixed at a temperature of 50° to 190° C. for at least one minute without reaction.

If the temperature exceeds 190° C., the imidizing reaction proceeds. If the temperature is lower than 50° C., viscosity of the polymer solution leaving the second reaction area is increased, failing to obtain a satisfactory mixed solution and, in addition, the pressure loss in the pipe is increased, thereby bringing about a risk of clogging the pipe.

As a mixing method, it is preferred to mix them by passing through a line using an in-line mixer or a static mixer. In this case, it is preferred that they are mixed for at least one minute. If the mixing in this area is insufficient, a distribution range for an imidization ratio of the resultant methacrylimide containing polymer becomes broader to eventually form a mixture of methacrylimide containing polymers of different imidization ratios and they become not transparent and deteriorate commercial value. It is preferred that the distribution range of the imidization ratio for the polymer is less than 5 %, more preferably, less than 2 %.

The methacrylic polymer obtained in the second reaction area and the imidizing material are reacted in the third reaction area. The third reaction area comprises at least two regions, that is, an upper region (b) and a lower region (a). It is necessary that the methacrylic polymer and the imidizing material are introduced from below the third reaction area, while the reaction product is taken out from above the area. In the present invention, the lower region (a) is a reaction region in which the methacrylic polymer and imidization reaction are reacted to cause condensation between side chains of methacrylic polymer and the other upper region (b) is an aging reaction region in which a reaction product containing the imidized polymer formed in the lower reaction region (a) is further heated to promote the imidization reaction further. Imidization for the methacrylic polymer is proceeded in the two steps of the lower reaction region (a) and the aging reaction region (b) described above. Further, it is possible, if required, to combine a plurality of reaction regions or a plurality of aging regions. Reaction between the methacrylic polymer and the imidizing material in the reaction zone is carried out at a temperature higher than 150° C. and lower than 350° C. If the reaction temperature is lower than 150° C., the imidization reaction is slow, whereas if it exceeds 350° C., decomposition reaction of the methacrylic polymer occurs simultaneously. There is no particular restriction for the reaction time in the reaction region but shorter period is preferred in view of the production efficiency and it is within a range from 20 minutes to 5 hours. In the case of continuous reaction, the average staying time is, likewise, within range of from about 20 minutes to 5 hours.

Whether the aging reaction is proceeding satisfactorily or not can le judged by measuring the amount of amide segments of the polymer. Preferred aging reaction is being taken place when the amount of the amide segments is less that 5% by weight, preferably, less than 3 % by weight. In the case of methacrylimide containing polymer having the amide segments in an amount greater than 5 % by weight it is likely to be tinted under heating and the product itself becomes yellowish.

A solution of the methacrylic polymer and the imidizing material are introduced from below the lower reaction region (a) and aging is conducted at the upper region (b). On the other hand, if the materials are introduced from above the upper region and then aged in the lower region, a polymer of insufficient aging is short-passed, and the amount of the amide segments in the methacrylimide containing polymer is increased, failing to obtain methacrylimide containing polymer of excellent transparency and less heat coloration.

In the imidization reaction, if water is present in the reaction system, hydrolysis of ester part of the methacrylic polymer with the water occurs as a side reaction in the course of the imidization reaction. As a result, methacrylic acid groups are formed in the resultant methacrylimide containing polymer, making it difficult to obtain a methacrylimide containing polymer having a high imidization ratio. Accordingly, the reaction is conducted under the conditions containing no substantial water in the reaction system, that is, with the water content of less than 1 % by weight, preferably, under an anhydrous condition.

Further, as the atmosphere for the reaction system, it is preferred to conduct reaction under an inert gas in which nitrogen, helium or argon gas is present in view of low coloration of the resultant imidized polymer.

As specific examples for the imidizing material represented by the formula (II), there can be mentioned, for example, aliphatic primary amines such as methylamine, ethylamine and propylamine; compounds forming aliphatic primary amines under heating such as 1,3-dimethyl urea, 1,3-diethyl urea and 1,3-dipropyl urea; ammonia and urea. Further, there can be mentioned aromatic amines such as aniline, toluidine or trichloroaniline, as well is cycloaliphatic amines such as cyclohexylamine and bornyl amine. Among the imidizing materials used, methylamine, ammonia and cyclohexylamine are preferred in view of high heat resistance and transparency of the imidized polymer.

Although the amount of the imidizing material used depends on the imidization ratio to be attained and it can not be defined generally, it is from 1 to 250 parts by weight based on 10 parts by weight of the methacrylic acid ester polymer. If it is less than 1 part by weight, no distinct improvement for the heat resistance can be expected On the other hand, if it exceeds 250 parts by weight, it is not preferred from an economical point of view.

The imidization reaction product taken out from the reaction region is supplied to an aging reaction region. The reaction in the aging reaction region is conducted like that the reaction in the proceeding step at a temperature higher than 150° C. and lower than 350° C., preferably, higher than 170° C. and lower than 300° C.

At least five minutes' aging time is required in the aging reaction region and, in a continuous reaction, more than 5 minutes' average staying time is also necessary. If the aging reaction is less than 5 minutes, no distinct aging effect can be expected. Although the reason for the effect that the aging reaction itself contributes to the product is not apparent, if the aging reaction is insufficient, unreacted amide segments remain in the imidized polymer products. Accordingly, reduction in the heat resistance, reduction in the resistance to heat decomposition and increase in the yellowness after the exposure to heat of the product become remarkable.

The imidization ratio of the methacrylic polymer is set to such an extent that the structural unit represented by the general formula (I) is within a range from 2 to 10 % by weight, preferably, 30 to 100 % by weight and, more preferably, 50 to 100 % by weight in view of high heat resistance of the polymer to be obtained. The methacrylimide containing polymer obtained by imidization has an intrinsic viscosity from 0.02 to 4.5 (the measuring method is to be described later).

As an apparatus used for the reaction in the third reaction area, there can be mentioned, for example, a stirring-mixing vessel type reaction device as described above, a reactor having two or more of reaction regions in one reactor, a screw extruder type reaction device, a column-like reaction device and a tubular reaction device. Among them, the stirring-mixing vessel type reaction device is particularly preferred. By using the stirring-mixing vessel reaction device, the polymer is homogenously imidized to obtain a methacrylimide containing polymer of excellent transparency and heat resistance.

After the completion of the imidization reaction, volatile ingredients are separated from the imidized polymer. Volatile matters can effectively be separated by flashing while maintaining the reaction product containing a large amount of volatile materials in a stable fluidized state. That is, the reaction product is heated to a temperature of 180° to 300° C., preferably, 200° to 250° C. and then flashed through a narrow nozzle opening into a vessel controlled to a pressure of less than the atmospheric pressure, preferably, a reduced pressure of from 20 to 200 Torr. The flashed polymer is received by a screw of an extruder, passed through the extruder and then discharged as a strand from a dice of the extruder.

Deaeration condition in the flashing and the screw extrusion condition are important in view of the color of the polymer product. It is preferred that the content of the low molecular weight amide derivatives as the volatile ingredient in the polymer is less than 1000 ppm, and the amount of the residual monomers is less than 500 ppm. If the content of the amide derivatives exceeds 1000 ppm, yellowish methacrylimide containing polymer is obtained. Further, if the amount of the residual monomers exceeds 500 ppm, silver streaks tend to be formed at the surface of the molding products in the case of molding the polymer at high temperature.

Further, as the deaeration extruder, there can be mentioned a bent type single screw or twin screw extruder, twin screw extruder being preferred in view of high kneading efficiency. However, in the case of the screw extruder, scraping under contact with a barrel tends to occur due to the deviation of the rotational shaft to result in the incorporation of scraped iron in the polymer. As a result of an earnest study, it has been found that incorporation of iron gives an effect on the color of the polymer. It is preferred that the iron content in the polymer according to the present invention is less than 20 ppm. If it exceeds 20 ppm, the polymer turns yellow when exposed to a high temperature atmosphere. More preferably, the iron content is less than 10 ppm. In the case of reducing the incorporation of the iron to less than 20 ppm, the screw portion of the extruder is made of corrosion resistant material such as by chromium plating. In addition, the barrel portion is also made corrosion resistant by using stainless steel, etc. Further, it is preferred that the screw shaft is made of superhard material for preventing scraping in the screw portion due to the deviation of the screw.

It is necessary that the weight average molecular weight (Mw) of the methacrylimide containing polymer according to the present invention is from 50,000 to 200,000, preferably, from 70,000 to 150,000 as measured by a GPC (gel permeation chromatography) method. If it is lower than 50,000, the polymer is too fragile to be applied to the commercial use. On the contrary, if it exceeds 200,000, viscosity of the polymer is increased when the polymer is molter for molding, reslting in undesirable increase in the birefringence of the molding products.

The first feature attained by the present invention resides in a methacrylimide containing polymer having excellent optical property, mechanical property, weather proofness and moldability, as well as heat resistance. Also, a methacrylimide containing polymer of excellent transparency and heat resistance, with extremely narrow distribution range of imidization ratio between the polymer molecules and with extremely less amide segment in the polymer can be obtained by mixing an inert solvent with a monomer, applying a particular treatment to the monomer solution, and conducting polymerization reaction for the monomer and subsequent imidization reaction and aging reaction in the presence of a solvent in a continuous process, thereby attaining uniform reaction. The conversion of the monomer into polymer, polymerization temperature and reaction mode in the first and second reaction areas are controlled and the resultant product and the imidizing material are uniformly mixed and introduced into the third reaction area, in which the imidization reaction and the aging reaction are conducted in the presence of a solvent in an area divided into at least two regions as explained above. Volatile ingredients are separated by a specific method from the resultant polymer and the polymer is then molded.

Example

The present invention is to be described more in detail referring to examples but it should be noted that the invention is not restricted to the examples. In the examples, "parts" and "%" mean, respectively, "parts by weight" and "% by weight" unless otherwise specified.

Measurement for the physical properties of the polymer in the following examples was carried out according to the methods described below.

(1) IR absorption spectra of the polymer were measured by using an IR spectrophotometer (Model 285, manufactured by Hitachi Ltd.) according to KBr disc method.

(2) Heat distortion temperature of the polymer was measured according to ASTM D-648.

(3) The total light transmittance (%) of the molded product was measured according to ASTM D-1003.

An injection molded flat plate, sized 40×40×3 mm, was used as the specimen.

(4) Imidization ratio

The imidization ratio of the polymer was calculated by determining the nitrogen content in the polymer based on an elemental analysis (measuring device: CHN coder, MT-3, manufactured by Yanagimoto Seisakusho Co.)

(Example) Imidization ratio X

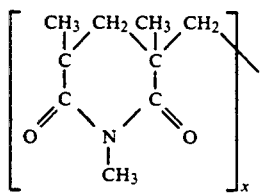

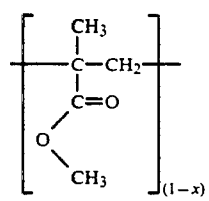

$$X(\%) = \frac{14x}{167x + (1 - x)100} \times 100$$

(5) Distribution range of the imidization ratio

Pellets of methacrylimide containing polymer formed by the method (4) were used as a mother group, 20 specimens were optionally sampled therefrom and imidization ratio was determined. The maximum value and the minimum value in the distribution were taken as the distribution range for the imidization ratio.

(6) Yellowness index ($YI_0$ value) of the molded product was measured by using a color difference meter, Color Analyzer (Model 307, manufactured by Hitachi Ltd.) according to the JIS K-7103.

An injection molded flat plate sized, 40×40×3 mm, was used as the specimen.

$$YI_o \text{ value} = \frac{100(1.28X - 10.6Z)}{Y}$$

X, Y and Z were calculated according to stimulation values.

After exposing the injection molded flat plate (3 mm plate) of the methacrylimide containing polymer at 130° C. for 1,000 hours in air, the yellowness (YI) was measured yellowness degree ($\Delta YI$) is calculated as follows.

$\Delta YI = YI - YI_0$ $\Delta YI$: yellowness degree

YI: yellowness after exposure $YI_0$: yellowness of the test specimen or test piece before exposure (7) Molecular weight measurement by GPC Molecular weight of the polymer is measured in accordance with descriptions in "Gel Chromatography (basic edition)", pp. 97–122, published from Kodansha.

Column HSG-20, 50 (manufactured by Shimazu Seisakusho, Co.). A calibration curve was prepared from a standard polystyrene (manufactured by Fresher Chemical and the specimen was leached out using tetrahydrofuran solution. The leaching curve obtained by using the specimen solution was equally divided and the height at each of the divisional points was measured to determine Mw by the following equation.

$$Mw = Qm \sum_i [Hi \times Mi(p)]/Qp \sum_i Hi$$

Where Hi: height of the leaching curve at the divisional point

Mi(p): molecular weight of a standard polystyrene at divisional point i.

Qm, Qp: Q factor for the polymer and polystyrene, which are respectively assumed as 40 and 41.

(8) Amount of fine particles (using HIAC-ROYCO)

Five gram of the polymer was weighed and dissolved in 30 ml of dichloroethane and fine particles of 0.5 to 25 μm were measured by detecting the scattering of the laser beams with a counter previously calibrated.

(9) Iron content in the polymer

After weighing five grams of the polymer, burning them in a gas burner and then dissolving into G-normal aqueous hydrochloric acid to prepare a 0.1N aqueous hydrochloric acid solution, the iron content was determined by measuring with a high frequency plasma emission spectrometer (Nippon Jarrel Ash Co.).

(10) Volatile ingredient in the polymer (amide derivative, residual monomer)

Polymer was dissolved in dimethylformamide and measured by gas chromatography.

(11) Measurement for the amount of amide segments amount in the polymer

The amount was measured by using an FT-NMR spectrometer (JNM-GSX-400, manufactured by Nippon Denshi Co.) with the TMS internal standard in 5 wt% d6-dimethylsulfoxide at 120° C. and the amount of the amide segments was expressed by % by weight based on the polymer.

(12) Measurement for the light transmission (transmission loss)

The resultant pellet polymer was molten and formed into a strand of 1 mm diameter and applied with a coating of an outer layer of low refractive index to obtain an optical transmission material. The transmission loss of the optical transmission material was measured in accordance with the method as described in Japanese Patent Laid-Open 187705/1987.

(13) Recovery of pellet

All of the pellets obtained from 24 hours' continuous operation in examples and comparative examples were entirely mixed, unless otherwise specified, and served for analysis and evaluation of the performance.

(14) Intrinsic viscosity

The intrinsic viscosity of the polymer was measured by determining the flowing time (ts) of a dimethylformamide solution at a concentration of the specimen polymer of 0.5 % by weight and the flowing time (to) of dimethylformamide at a temperature of 25°±0.1° C. by a Deereax-Bischoff viscometer, determining the relative viscosity $\eta rel$ of the polymer based on the value ts/to and then calculating by the following equation:

$$\text{Intrinsic viscosity} = \lim \ln(\eta rel)/c \quad c \rightarrow 0$$

where c represents the value for the grams of the polymer per 100 ml of solvent.

Example 1

A feed solution for polymerization comprising 65 parts of methyl methacrylate, 30 parts of toluene, 5 parts of methanol, 0.08 parts of 1,1-azobiscyclohexane carbonitrile, 0.0325 parts of 2,2-azobisisobutyro nitrile and 0.15 parts of n-octyl mercaptan was continuously supplied to a nitrogen-feed countercurrent contact tower (nitrogen feed solution = 1 : 100 weight ratio) to reduce the amount of dissolved oxygen in the feed solution to 0.6 ppm. Then, the number of fine particles of 0.5-25 μm in the feed solution was reduced to 100/ml by using 0.1 pm pore size FLUOROPORE (manufactured by Sumitomo Denko Co.) to prepare a feed solution at high purity, which was then continuously supplied at a rate of 4 L/Hr into a first stirring vessel type reaction device of 20 liter inner volume. When the polymerization conversion just after the reaction device was measured, it was 65%.

The polymer solution was introduced into a multi-tube type heat-exchanging second reactor (comprising 30 straight pipes each of 12.7 mm inner diameter and 1000 mm length to proceed polymerization up to 95 % conversion at a temperature of 140° C. Further, the polymer solution was mixed with the imidizing material described below and then supplied to a stirring vessel type reaction device as the third reaction area.

Separately, a mixed solvent (toluene methanol = 1 : 1 weight ratio) was treated in the same manner as the feed solution described above to reduce the amount of dissolved oxygen to 0.6 ppm, adjusted to 40 % solution by weight with addition of methylamine, passed through 0.1 μm pore size FLUOROPORE, supplied at a rate of 1.2 L/Hr, mixed with the polymer solution described above to the third reaction area. The imidizing material and the polymer solution were mixed sufficiently at 100° C. for a staying time of 5 minutes by using an in-line mixer and then supplied to the third reaction area. The mixed solution of the polymer solution and the imidizing material is supplied from below the stirring type reaction device as the third reaction area (15 L inner volume, 230° C. of temperature) and, after imidizing reaction, the reaction solution leaving the reaction region was supplied to a stirring vessel type reaction device as the upper aging reaction region with an inner volume of 3 liter and at a temperature of 230° C. The reaction solution leaving the reaction region was flashed from a nozzle opening into a vessel controlled to a reduced pressure of 100 Torr, the flashed polymer was supplied to a screw rendered corrosion resistant by chromium plating (shaft was made of superhard steel material) and then molded into a strand-like shape by a twine screw extruder with 30φ double bent holding stainless steel barrel and finally pelletized. The twin screw extruder was set to a vacuum degree of 5 mmHg and a temperature of 260° C. in the bent portion, a temperature of 270° C. in the metering portion and a temperature of 255° C. in the dice portion. When the IR spectra of the resultant pellet-polymer were measured, absorptions inherent in methacrylimide were observed at a number of waves of 1720 cm$^{-1}$, 1653 cm$^{-1}$ and 750 cm$^{-1}$, to confirm that it was methacrylimide containing polymer.

Physical properties of the resultant polymer are as shown below.

| | |
|---|---|
| Total light transmittance (%) | 93 |
| Heat distortion temperature (°C.) | 145 |
| Imidization ratio (%) | 80 |
| Distribution range for the imidization ratio (%) | 1.7 |
| YI | 1.0 |
| ΔYI | 1.0 |
| Amide segment in the polymer (%) | 1.1 |
| Amide derivative in the polymer (N-methylmethacrylamide) (ppm) | 250 |
| Residual monomer in the polymer (methylmethacrylate) (ppm) | 100 |
| Number of fine particles in the polymer (particles/g polymer) | 12000 |
| Molecular weight (Mw) measured by GPC | 85000 |
| Iron content in the polymer (ppm) | 1.0 |

As described above, a methacrylimide containing polymer of high transparency and heat resistance and of excellent yellowness and yellowing degree was obtained.

Comparative Example 1

First and second reaction devices and reaction procedures therein were quite the same as those in Example 1, and a mixed solution of the polymer solution and the imidizing material (methylamine) was introduced from the upper region and the reaction product was taken out from the lower region of the third reaction region contrary to Example 1 and the aging reaction region was substantially eliminated. Other devices and procedures employed were quite the same as those in Example 1.

Physical properties of the resultant polymer are as shown below.

| | |
|---|---|
| Total light transmittance (%) | 87 |
| Heat distortion temperature (°C.) | 143 |
| Imidization ratio (%) | 80 |
| Distribution range for the imidization ratio (%) | 3 |
| YI | 3.5 |
| ΔYI | 2.9 |
| Amide segment in the polymer (%) | 7.0 |
| Amide derivative in the polymer (N-methylmethacrylamide) (ppm) | 250 |
| Residual monomer in the polymer (methylmethacrylate) (ppm) | 100 |
| Number of fine particles in the polymer (particles/g polymer) | 12000 |
| Molecular weight (Mw) measured by GPC | 85000 |
| Iron content in the polymer (ppm) | 1.0 |

As described above, when compared with Example 1, the imidizing reaction is not completed, the amount of the amide segment is increased to deteriorate the heat resistance and the yellowness, aging coloration under heating and yellowing degree were also poor.

Example 2

The devices and procedures employed were quite the same as those in Example 1 except for using a feed solution for polymerization comprising 65 parts of methylmethacrylate, 30 parts of toluene, 5 parts of methanol and 0.1 parts of 1,1'-azobiscyclohexane carbonitrile was used.

Physical properties of the resultant polymer are as shown below.

| | |
|---|---|
| Total light transmittance (%) | 93 |
| Heat distortion temperature (°C.) | 145 |
| Imidization ratio (%) | 80 |
| Distribution range for the imidization ratio (%) | 3.0 |
| YI | 1.0 |
| ΔYI | 0.5 |
| Amide segment in the polymer (%) | 1.2 |
| Amide derivative in the polymer (N-methylmethacrylamide) (ppm) | 350 |
| Residual monomer in the polymer (methylmethacrylate) (ppm) | 130 |
| Number of fine particles in the polymer (particles/g polymer) | 13000 |
| Molecular weight measured by GPC (Mw) | 100000 |
| Iron content in the polymer (ppm) | 0.8 |

As described above, a methacrylimide containing polymer of excellent transparency and heat resistance, as well as excellent yellowness and aging coloration under heating (yellowing degree) was obtained.

Example 3

70 parts of methylmethacrylate, 30 parts of toluene, 0.1 parts of 1,1'-azobiscyclohexane carbonitrile and 0.12 parts of n-octyl mercaptan were subjected to polymerization in the same procedures as in Example 1 excepting for setting the temperature to 140° C. and polymerization conversion ratio to 75 % in the first reaction device and temperature to 135° C. and the polymerization conversion ratio to 95 % in the second reaction device. The polymer solution was introduced into the third reaction device at a temperature of 230° C. and imidization process was carried out in the same manner as in Example 1 excepting for supplying 50 % methylamine solution in methanol at a rate of 1.5 liter/Hr.

The physical property of the resultant polymer are as shown below.

| | |
|---|---|
| Total light transmittance (%) | 93 |
| Heat distortion temperature (°C.) | 178 |
| Imidization ratio (%) | 92 |
| Distribution range for the imidization ratio (%) | 3.0 |
| YI | 1.3 |
| ΔYI | 1.0 |
| Amide segment in the polymer (%) | 1.3 |
| Amide derivative in the polymer (N-methylmethacrylamide) (ppm) | 450 |
| Residual monomer in the polymer (methylmethacrylate) (ppm) | 300 |
| Number of fine particles in the polymer (particles/g polymer) | 13500 |
| Molecular weight measured by GPC (Mw) | 87000 |
| Iron content in the polymer (ppm) | 1.3 |

As described above, a methacrylimide containing polymer of excellent transparency and heat resistance, as well as excellent yellowness and aging coloration under heating (yellowing degree) was obtained.

Example 4

65 parts of methylmethacrylate, 5 parts of methylacrylate, 20 parts of methanol, 10 parts of toluene, 0.06 parts of di-tert-butyl peroxide, 0.05 parts of dicumyl peroxide and 0.1 parts of tert-butyl methane were subjected to polymerization in the same procedures as those in Example 1 except for setting the temperature to 140° C. and the polymerization conversion ratio to 72 % in the first reaction device, the temperature to 150° C. and the polymerization conversion ratio to 95 % in the second reaction device, and the temperature to 250° C. in the third reaction device.

The physical property of the resultant polymer are as shown below.

| | |
|---|---|
| Total light transmittance (%) | 93 |
| Heat distortion temperature (°C.) | 145 |
| Imidization ratio (%) | 82 |
| Distribution range for the imidization ratio (%) | 2.6 |
| YI | 1.6 |
| ΔYI | 2.3 |
| Amide segment in the polymer (%) | 0.9 |
| Amide derivative in the polymer (N-methylmethacrylamide) (ppm) | 250 |
| Residual monomer in the polymer (methylmethacrylate) (ppm) | 90 |
| Number of fine particles in the polymer (particles/g polymer) | 10500 |
| Molecular weight measured by GPC (Mw) | 77000 |
| Iron content in the polymer (ppm) | 0.9 |

Example 5

The procedures were quite the same as those in Example 1 except for supplying ethylamine as the imidizing material to the third reaction device in Example 1.

The physical property of the resultant polymer are as shown below.

| | |
|---|---|
| Total light transmittance (%) | 93 |
| Heat distortion temperature (°C.) | 130 |
| Imidization ratio (%) | 82 |
| Distribution range for the imidization ratio (%) | 2.5 |
| YI | 1.2 |
| ΔYI | 0.9 |
| Amide segment in the polymer (%) | 1.0 |
| Amide derivative in the polymer (N-methylmethacrylamide) (ppm) | 155 |

| | |
|---|---|
| Residual monomer in the polymer (methylmethacrylate) (ppm) | 110 |
| Number of fine particles in the polymer (particles/g polymer) | 10000 |
| Molecular weight measured by GPC (Mw) | 84000 |
| Iron content in the polymer (ppm) | 1.1 |

Comparative Example 2

The procedures were quite the same as those in Example 1 except for supplying the polymer solution and the imidizing material without using the in-line mixer to the third reaction region, in which the aging reaction region was omitted, and the reaction solution leaving the reaction region was flashed under an atmospheric pressure, using a twin extruder having a screw not applied with chromium plating, a barrel made of usual nitride steel and a screw shaft made of usual steel material instead of superhard steel material and, further, saving filtration with the 0.1 μm pore size FLUOROPORE filtration for the feed solution and methylamine.

Example 6

The procedures were quite the same as those in Comparative Example 2 except for providing an aging reaction region of 3 liter inner volume at a temperature of 230° C. in Comparative Example 2.

Example 7

The procedures were quite the same as those in Example 6 except for mixing of the polymer solution and the imidizing material was sufficiently conducted by using an in-line mixer and then supplying them to the third reaction region.

Example 8

The procedures were quite the same as those in Example 6 except for using a twin screw extruder having a screw made of superhard steel material rendered corrosion resistant by applying chromium plating and a barrel made of stainless steel in Example 6.

Example 9

The procedures were quite the same as those in Example 8 except for filtering the feed solution and the methylamine solution through 0.1 μm pore size FLUOROPORE.

Example 10

The first, second and third reaction devices and the reaction procedures therein were quite the same as those in Example 1 except for flashing the reaction solution leaving the reaction region under an atmospheric pressure. Other devices and procedures were quite the same as those in Example 1.

The physical property of the resultant polymer are as shown below.

| | |
|---|---|
| Total light transmittance (%) | 87 |
| Heat distortion temperature (°C.) | 145 |
| Imidization ratio (%) | 80 |
| Distribution range for the imidization ratio (%) | 3.0 |
| YI | 3.3 |
| ΔYI | 3.0 |
| Amide segment in the polymer (%) | 1.3 |
| Amide derivative in the polymer (N-methylmethacrylamide) (ppm) | 2300 |
| Residual monomer in the polymer (methylmethacrylate) (ppm) | 1100 |
| Number of fine particles in the polymer (particles/g polymer) | 12000 |
| Molecular weight measured by GPC (Mw) | 85000 |
| Iron content in the polymer (ppm) | 1.0 |

As described above, when compared with Example 1, the amount of the amide derivative and the residual monomer in the polymer were increased, yellowness, aging coloration under heating and yellowing degree of the product were poor and silver streaks were formed partially in the molding product.

Example 11

The procedures were quite the same as those in Example 9 except for sufficiently mixing the polymer solution and the imidizing material in an in-line mixer and then supplying them to the third reaction region.

Example 12

The procedures were quite the same as those in Example 6 except for flashing the reaction solution leaving the reaction region from a nozzle opening into a vessel adjusted to a reduced pressure of 6 Torr in Example 6.

Example 13

The first, second and third reaction devices and the reaction procedures therein were quite the same as those in Example 1, and a twin screw extruder with 30φ double bent had a screw with no chromium plating and a barrel made of usual nitride steel. Further, the screw shaft was made of usual steel material instead of superhard steel material.

The physical property of the resultant polymer are as shown below.

| | |
|---|---|
| Total light transmittance (%) | 93 |
| Heat distortion temperature (°C.) | 145 |
| Imidization ratio (%) | 80 |
| Distribution range for the imidization ratio (%) | 3.0 |
| YI | 1.0 |
| ΔYI | 3.5 |
| Amide segment in the polymer (%) | 1.1 |
| Amide derivative in the polymer (N-methylmethacrylamide) (ppm) | 250 |
| Residual monomer in the polymer (methylmethacrylate) (ppm) | 100 |
| Number of fine particles in the polymer (particles/g polymer) | 55000 |
| Molecular weight measured by GPC (Mw) | 85000 |
| Iron content in the polymer (ppm) | 25 |

As described above, when compared with Example 1, it was shown that the iron content and the number of fine particles caused by scraping of the screw were increased and the product was poor in the aging coloration under heating (yellowing degree).

Example 14

The procedure were quite the same as those in Example 12 except for using a twin screw extruder having a screw made of superhard steel material rendered corrosion resistant by chromium plating and a barrel made of stainless steel.

Example 15

The first and the second reaction devices and the reaction procedures therein were quite the same as those in Example 1 except for mixing the polymer solution formed in the second reaction device and the imidizing material (methylamine) solution without using an in-line mixer and then introducing them into the third reaction region. Other devices and procedures employed were quite the same as those in Example 1.

The physical property of the resultant polymer are as shown below.

| | |
|---|---|
| Total light transmittance (%) | 89 |
| Heat distortion temperature (°C.) | 145 |
| Imidization ratio (%) | 80 |
| Distribution range for the imidization ratio (%) | 7 |
| YI | 1.5 |
| ΔYI | 1.0 |
| Amide segment in the polymer (%) | 1.3 |
| Amide derivative in the polymer (N-methylmethacrylamide) (ppm) | 250 |
| Residual monomer in the polymer (methylmethacrylate) (ppm) | 100 |
| Number of fine particles in the polymer (particles/g polymer) | 12000 |
| Molecular weight measured by GPC (Mw) | 85000 |
| Iron content in the polymer (ppm) | 1.0 |

As has been described above, when compared with Example 1, it was shown that the distribution range of the imidizing ratio was widened and the total light transmittance was reduced.

Example 16

The devices and the procedures were the quite same as those in Example 1 except for changing the amount of dissolved oxygen in the polymerization feed solution and the imidizing material solution (toluene/methanol) to 100 ppm.

The physical property of the resultant polymer are as shown below.

| | |
|---|---|
| Total light transmittance (%) | 93 |
| Heat distortion temperature (°C.) | 145 |
| Imidization ratio (%) | 80 |
| Distribution range for the imidization ratio (%) | 3.0 |
| YI | 5.0 |
| ΔYI | 2.5 |
| Amide segment in the polymer (%) | 1.2 |
| Amide derivative in the polymer (N-methylmethacrylamide) (ppm) | 350 |
| Residual monomer in the polymer (methylmethacrylate) (ppm) | 150 |
| Number of fine particles in the polymer (particles/g polymer) | 25000 |
| Molecular weight measured by GPC (Mw) | 85000 |
| Iron content in the polymer (ppm) | 8.5 |

As described above when compared with Example 1, it was shown that the polymer had intense yellowness and poor in the aging degradation under heating and yellowing degree. It is considered due to the fact that the methacylimide containing polymer itself suffered from oxidative degradation in the production device and oxidative corrosion was progressed in the production device itself.

Example 17

The procedures were quite the same as those in Example 1 except for saving the filtration with FLUOROPORE for the starting material feed solution and the methylamine solution.

The result of analysis and the result of evaluation for the performance of the polymethacrylimides obtained in Examples 1-17 and Comparative Examples 1 and 2 are collectively shown in the following table. In the Table, "Ref." means Comparative Example.

TABLE

| No. | Light transmittance (%) | HDT (°C.) | Imidization ratio (mol %) | Distribution of imidization ratio (%) | YI | ΔYI | Polymer amide (%) | Monomer amide (PPM) | Residual monomer (PPM) | Fine particles (particle/g) | Iron content (PPM) | Molecular weight (Mw) | Transmission loss (DB/KM) |
|---|---|---|---|---|---|---|---|---|---|---|---|---|---|
| Ex. 1 | 93 | 145 | 80 | 1.7 | 1 | 1 | 1.1 | 250 | 100 | 12.000 | 1 | 85.000 | 800 |
| Ex. 2 | 93 | 145 | 80 | 3 | 1 | 0.5 | 1.2 | 350 | 130 | 13.000 | 0.8 | 100.000 | — |
| Ex. 3 | 93 | 145 | 92 | 3 | 1.3 | 1 | 1.3 | 450 | 300 | 13.500 | 1.3 | 87.000 | — |
| Ex. 4 | 93 | 145 | 82 | 2.6 | 1.6 | 2.3 | 0.9 | 250 | 90 | 10.500 | 0.9 | 77.000 | — |
| Ex. 5 | 93 | 130 | 82 | 2.5 | 1.2 | 0.9 | 1.0 | — | — | — | — | — | — |
| Ref. 1 | 87 | 143 | 80 | 3 | 3.5 | 2.9 | 7 | 250 | 100 | 12.000 | 1 | 85.000 | 1200 |
| Ref. 2 | 85 | 143 | 80 | 8 | 4.5 | 5.2 | 7 | 1600 | 700 | 120.000 | 30 | 85.000 | — |
| Ex. 6 | 87 | 145 | 80 | 8 | 3.0 | 3.5 | 1.1 | 1700 | 700 | 120.000 | 30 | 85.000 | — |
| Ex. 7 | 89 | 145 | 80 | 1.7 | 2.7 | 3.5 | 1.1 | 1700 | 600 | 120.000 | 30 | 85.000 | — |
| Ex. 8 | 87 | 145 | 80 | 8 | 2.8 | 1.4 | 1.1 | 1600 | 700 | 100.000 | 1 | 85.000 | — |
| Ex. 9 | 87 | 145 | 80 | 8 | 2.8 | 1.4 | 1.1 | 1600 | 700 | 15.000 | 1 | 85.000 | — |
| Ex. 10 | 87 | 145 | 80 | 3 | 3.3 | 3.0 | 1.3 | 2300 | 1100 | 12.000 | 1 | 85.000 | — |
| Ex. 11 | 90 | 145 | 80 | 3 | 2.4 | 1.5 | 1.3 | 1600 | 700 | 12.000 | 1 | 85.000 | — |
| Ex. 12 | 90 | 145 | 80 | 8 | 1.8 | 3.3 | 1.1 | 250 | 100 | 120.000 | 30 | 85.000 | 4000 |
| Ex. 13 | 93 | 145 | 80 | 3 | 1.0 | 3.5 | 1.1 | 250 | 100 | 55.000 | 25 | 85.000 | — |
| Ex. 14 | 89 | 145 | 80 | 8 | 1.7 | 1.0 | 1.1 | 250 | 100 | 100.000 | 1 | 85.000 | 4000 |
| Ex. 15 | 89 | 145 | 80 | 7 | 1.5 | 1.0 | 1.3 | 250 | 100 | 12.000 | 1 | 85.000 | 3000 |
| Ex. 16 | 93 | 145 | 80 | 3 | 5 | 2.5 | 1.2 | 350 | 150 | 25.000 | 8.5 | 85.000 | — |
| Ex. 17 | 92 | 145 | 80 | 3 | 1.2 | 1.0 | 1.1 | 250 | 150 | 100.000 | 1 | 85.000 | 1900 |

What is claimed is:

1. A methacrylimide containing polymer comprising from 2 to 100% by weight of a structural unit represented by the general formula (I):

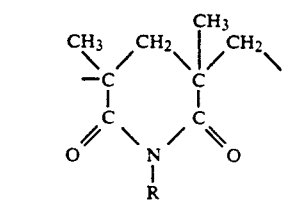

where R represents a hydrogen atom or an aliphatic group, aromatic group or cycloaliphatic hydrocarbon group with 1 to 20 carbon atoms and from 0 to 98% by weight of a structural unit derived from an ethylenic monomer, the polymer having:
- (a) a molecular weight (Mw) of greater than 50,000 and less than 200,000 as measured by GPC,
- (b) an amount of amide segments in the polymer of less than 5% by weight,
- (c) a yellowness index ($YI_0$) of 3 or below,
- (d) a yellowness degree ($\Delta YI$) of 3 or below,
- (e) an iron content in the polymer of less than 20 ppm, and
- (f) a content of fine particles sized from 0.5 μm to 25 μm in the polymer as measured by a fine particle counter of less than 50,000/g of the polymer, said polymer having been prepared by a process wherein an inert gas is introduced into methyl methacrylate or a mixture of methyl methacrylate and an ethylenic monomer copolymerizable with the methyl methacrylate to reduce the amount of dissolved oxygen, polymerization or copolymerization of methyl methacrylate, imidization of the polymer or copolymer of methyl methacrylate to form a methacrylimide containing polymer, and separation of volatile materials from the methacrylimide containing polymer are carried out continuously.

2. A methacrylimide containing polymer as defined in claim 1, wherein an amount of low molecular weight amide derivatives as a volatile ingredient in the polymer is less than 1000 ppm and an amount of residual monomers as the volatile ingredient in the polymer is less than 500 ppm.

3. A methacrylimide containing polymer as defined in claim 1, wherein a distribution range for an imidization ratio of the polymer is 5 % or below.

4. A methacrylimide containing polymer comprising from 2 to 100 % by weight of a structural unit represented by the general formula (I):

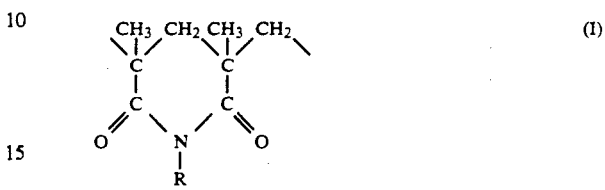

where R represents a hydrogen atom or an aliphatic group, aromatic group or cycloaliphatic hydrocarbon group with 1 to 20 carbon atoms and from 0 to 98 % by weight of a structural unit derived from an ethylenic monomer, the polymer having
- (a) a molecular weight (Mw) of greater than 50,000 and less than 200,000 as measured by GPC and
- (b) an amount of amide segments in the polymer of less than 5% by weight and wherein the distribution range for the imidization ratio of the polymer is 5% or below.

* * * * *